(12) United States Patent
Takabayashi et al.

(10) Patent No.: US 9,546,863 B2
(45) Date of Patent: Jan. 17, 2017

(54) THREE-DIMENSIONAL MEASURING APPARATUS AND CONTROL METHOD THEREFOR

(71) Applicant: CANON KABUSHIKI KAISHA, TOKYO (JP)

(72) Inventors: Shiki Takabayashi, Tokyo (JP); Hiroshi Yoshikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 14/096,136

(22) Filed: Dec. 4, 2013

(65) Prior Publication Data

US 2014/0168662 A1 Jun. 19, 2014

(30) Foreign Application Priority Data

Dec. 19, 2012 (JP) ................................ 2012-277438

(51) Int. Cl.
*G01B 11/24* (2006.01)
*G01B 11/25* (2006.01)
*G06T 7/00* (2006.01)

(52) U.S. Cl.
CPC ......... *G01B 11/2513* (2013.01); *G06T 7/0057* (2013.01); *G06T 2207/10152* (2013.01)

(58) Field of Classification Search
None
See application file for complete search history.

(56) References Cited

U.S. PATENT DOCUMENTS

| | | | |
|---|---|---|---|
| 7,643,157 B2 | 1/2010 | Takizawa et al. | |
| 2012/0154577 A1 | 6/2012 | Yoshikawa | |
| 2013/0046506 A1 | 2/2013 | Takabayashi | |
| 2013/0076896 A1 | 3/2013 | Takabayashi et al. | |
| 2013/0242090 A1 | 9/2013 | Yoshikawa | |
| 2014/0341480 A1* | 11/2014 | Hamada | G06T 5/002 382/264 |

FOREIGN PATENT DOCUMENTS

| | | |
|---|---|---|
| JP | H09-280818 A | 10/1997 |
| JP | 3996560 B | 10/2007 |
| JP | 2008-185582 A | 8/2008 |
| JP | 2010-041436 A | 2/2010 |

* cited by examiner

*Primary Examiner* — Kara E Geisel
*Assistant Examiner* — Amanda Merlino
(74) *Attorney, Agent, or Firm* — Fitzpatrick, Cella, Harper & Scinto

(57) ABSTRACT

According to the invention, reliability is calculated in consideration of an uncertain error due to noise in three-dimensional measurement, thereby obtaining correct reliability as compared with a conventional technique. To achieve this, a three-dimensional measuring apparatus includes a projector which projects a striped light pattern onto an object, a camera which captures a reflected light pattern from the object onto which the striped light pattern is projected, and a calculation processing unit which executes various arithmetic operations. The calculation processing unit includes a noise calculating unit and a reliability calculating unit.

24 Claims, 14 Drawing Sheets

2bit

THREE-DIMENSIONAL MEASURING APPARATUS AND CONTROL METHOD THEREFOR

BACKGROUND OF THE INVENTION

Field of the Invention

The present invention relates to a three-dimensional measuring technique of measuring the surface shape of an object.

Description of the Related Art

There is known a pattern projecting method to measure the shape of an object based on deformation of a pattern projected onto the object, using the principle of triangulation, by projecting a plurality of kinds of light patterns onto the object and capturing the object upon projection of each light pattern. By using the Space Coding method as an example, a measuring method and the concept of reliability will be explained below.

The arrangement of a general apparatus for measuring a three-dimensional shape and the concept of three-dimensional measurement will be described with reference to FIG. 11. A three-dimensional measuring apparatus generally includes a projector 102 which projects a light pattern onto an object (an object to be measured) 110, and a camera 103 which captures a reflected pattern from the object 110. The projector 102 projects, onto the object 110, a striped light pattern in which a bright section and a dark section alternate with an arbitrary width. The striped light pattern includes a plurality of predetermined pattern shapes. Every time each of the pattern shapes is projected, the camera 103 captures the pattern shape to acquire image data. Let (X, Y, Z) be the boundary position between a bright section and a dark section of the object 110. (X1, Y1) represents the position of the intersection point of the display element surface of the projector 102 and a straight line which connects the boundary position (X, Y, Z) with the principal point of the projector 102. Similarly, (X2, Y2) represents the position of the intersection point of the sensor surface of the camera 103 and a straight line which connects the boundary position (X, Y, Z) with the principal point of the camera 103. Note that the position (X2, Y2) of the intersection of the sensor surface of the camera 103 is obtained by the horizontal coordinate of the image sensor (CCD, CMOS, or the like) of the camera 103. The horizontal coordinate is determined by the horizontal and vertical widths of the image sensor. For a 640×480 image sensor, the x-coordinate in the horizontal direction ranges from 0 to 640 and the y-coordinate in the vertical direction ranges from 0 to 480. Similarly, the position (X1, Y1) of the intersection point of the display element surface of the projector 102 is obtained by the horizontal coordinate of a projection sensor. A distance L between the projector 102 and the camera 103 is the base line length and is determined based on the arrangement condition of the apparatus. It is possible to obtain the boundary position (X, Y, Z) of the object 110 using those parameters according to the principle of triangulation. It is thus possible to measure the three-dimensional shape of the object 110 by obtaining the boundary position (X, Y, Z) for the entire surface of the object 110.

The shape of the striped light pattern will be explained. A striped light pattern of a binary code called a gray code having a coding error resilience will be described below with reference to FIGS. 12A to 12C. A section which is observed as black on a captured reflected pattern corresponds to "0", and that which is observed as white corresponds to "1". Referring to FIG. 12A, the entire pattern is divided into two regions, which are encoded as "1" and "0". Referring to FIG. 12B, four regions of bright and dark sections are encoded as "1", "0", "0", and "1", and irradiated with a corresponding striped light pattern to be captured. Furthermore, referring to FIG. 12C, eight regions are encoded as "1", "0", "0", "1", "1", "0", "0", and "1", and irradiated with a corresponding striped light pattern to be captured. When the regions are sequentially irradiated with these three kinds of striped patterns, each region can be represented by three bits. That is, the respective regions can be described by (1, 1, 1), (1, 1, 0), (1, 0, 0), (1, 0, 1), (0, 0, 1), (0, 0, 0), (0, 1, 0), and (0, 1, 1). Since a space can be divided into eight regions using the three striped light patterns in this manner, the Space Coding will be referred to as 3-bit Space Coding hereinafter. Then, the respective striped light patterns shown in FIGS. 12A to 12C will be respectively referred to as 1-bit striped light pattern, 2-bit striped light pattern, and 3-bit striped light pattern hereinafter.

To perform three-dimensional measurement in more detail, regions of bright and dark sections are irradiated with n striped light patterns while sequentially reducing the regions in size. Then, by assigning region numbers obtained by dividing an irradiation region of the projector into $2^n$ regions, the respective regions can be determined. In three-dimensional measurement in which a region is divided into 1024 regions, 10-bit Space Coding is performed.

The merit of the gray code lies in that even when a coding error occurs at a region boundary due to a shift or blur of a striped light pattern, such error is merely determined to be a neighboring region, and does not cause any coding error as a largely shifted region. For this reason, the Space Coding method using the gray code is generally used.

To improve the precision in three-dimensional measurement by the Space Coding method, a horizontal coordinate position x (to be referred to as "boundary position" hereinafter) of the boundary between bright and dark sections has to be decided from captured image data. The boundary position between bright and dark sections will be described with reference to FIGS. 13A and 13B. FIG. 13A is a graph when the ordinate plots the luminance values of image data obtained by capturing a 2-bit striped light pattern, and the abscissa plots the horizontal coordinates x. Ideal boundary positions are shown in the lower portion of FIG. 13A. In FIG. 13A, since the bright and dark sections have different luminance values "1" and "0" at the boundaries, the boundary positions between the bright and dark sections are uniquely decided. That is, positions a and b can be decided as boundary positions. However, in actual measurement, a moderate change is observed in the vicinity of each boundary in an image actually captured by the camera 103 due to the influences of, for example, a blur of a striped light pattern, the reflectance of an object, and ambient light, as shown in FIG. 13B, and boundary positions cannot be uniquely decided, thus causing measurement errors.

To avoid such program, a method which assigns reliability indicating measurement precision to each measuring point, and does not use measuring coordinates if the reliability of the coordinates is equal to or lower than a threshold is disclosed (for example, see Japanese Patent No. 3996560 which is to be referred to as reference 1 hereinafter).

In reference 1, an object is irradiated with full-illumination light corresponding to a bright section on the entire pattern and full-extinction light corresponding to a dark section on the entire pattern in addition to a striped light pattern. The upper limit luminance value obtained by the full-illumination light and the lower limit luminance value obtained by the full-extinction light are obtained and used to calculate contrast, thereby setting it as reliability.

In the technique disclosed in reference 1, the contrast of a striped light pattern is set as reliability. In this case, the influence of a luminance exerted by noise in three-dimensional measurement is not considered. Three-dimensional measurement actually includes uncertain noise (to be referred to as noise information in the three-dimensional measurement hereinafter) due to the camera, object, projector, ambient light, and the like. Consequently, the reliability based on the contrast obtained in reference 1 does not include noise information in three-dimensional measurement, and thus has an incorrect value.

SUMMARY OF THE INVENTION

The present invention has been made in consideration of the above problem, and provides a technique capable of performing measurement with higher reliability in consideration of noise information in three-dimensional measurement.

This specification in its first aspect provides a three-dimensional measuring apparatus for measuring a three-dimensional shape of an object to be measured, comprising: a projecting unit which projects a light pattern on the object to be measured to measure the shape of the object to be measured; a capturing unit which captures the object to be measured onto which the light pattern is projected; a deriving unit which derives noise information in measurement of the three-dimensional shape of the object to be measured, that is caused by at least one of the projecting unit, the capturing unit, and the object to be measured; a reliability calculating unit which obtains, based on the noise information, reliability of measurement of the three-dimensional shape of the object to be measured; and an acquiring unit which acquires, based on an image captured by the capturing unit and the reliability, the three-dimensional shape of the object to be measured.

This specification in its second aspect provides a three-dimensional measuring apparatus for measuring a three-dimensional shape of an object to be measured, comprising: a projecting unit which projects a light pattern onto the object to be measured to measure the three-dimensional shape of the object to be measured; a capturing unit which captures reflected light from the object to be measured onto which the light pattern is projected; a reliability calculating unit which obtains reliability of three-dimensional measurement of the object to be measured by dividing an image of the object to be measured into predetermined regions and calculating a ratio of contours or a plane based on a feature of a shape within the regions; and an acquiring unit which acquires, based on an image captured by the capturing unit and the reliability, the three-dimensional shape of the object to be measured.

This specification in its third aspect provides a control method for a three-dimensional measuring apparatus for measuring a three-dimensional shape of an object to be measured, comprising: a projecting step of projecting a light pattern onto the object to be measured to measure the three-dimensional shape of the object to be measured; a capturing step of capturing the object to be measured onto which the light pattern is projected; a deriving step of deriving noise information in measurement of the three-dimensional shape of the object to be measured, which is caused by at least one of a projecting unit, a capturing unit, and the object to be measured; a reliability calculating step of obtaining, based on the noise information, reliability of measurement of the three-dimensional shape of the object to be measured; and an acquiring step of acquiring, based on a captured image and the reliability, the three-dimensional shape of the object to be measured.

This specification in its fourth aspect provides a control method for a three-dimensional measuring apparatus for measuring a three-dimensional shape of an object to be measured, comprising: a projecting step of projecting a light pattern onto the object to be measured to measure the three-dimensional shape of the object to be measured; a capturing step of capturing reflected light from the object to be measured onto which the light pattern is projected; a reliability calculating step of obtaining reliability of measurement of the three-dimensional shape of the object to be measured by dividing an image of the object to be measured into predetermined regions and calculating a ratio of contours or a plane based on a feature of the shape within the regions; and an acquiring step of acquiring, based on a captured image and the reliability, the three-dimensional shape of the object to be measured.

According to the present invention, it is possible to perform measurement with higher reliability in consideration of noise information in three-dimensional measurement.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings.

First Embodiment

In the first embodiment, a reliability calculating method in the Space Coding method as one method of performing three-dimensional measurement by projecting and capturing a striped pattern will be explained.

Figure 1:
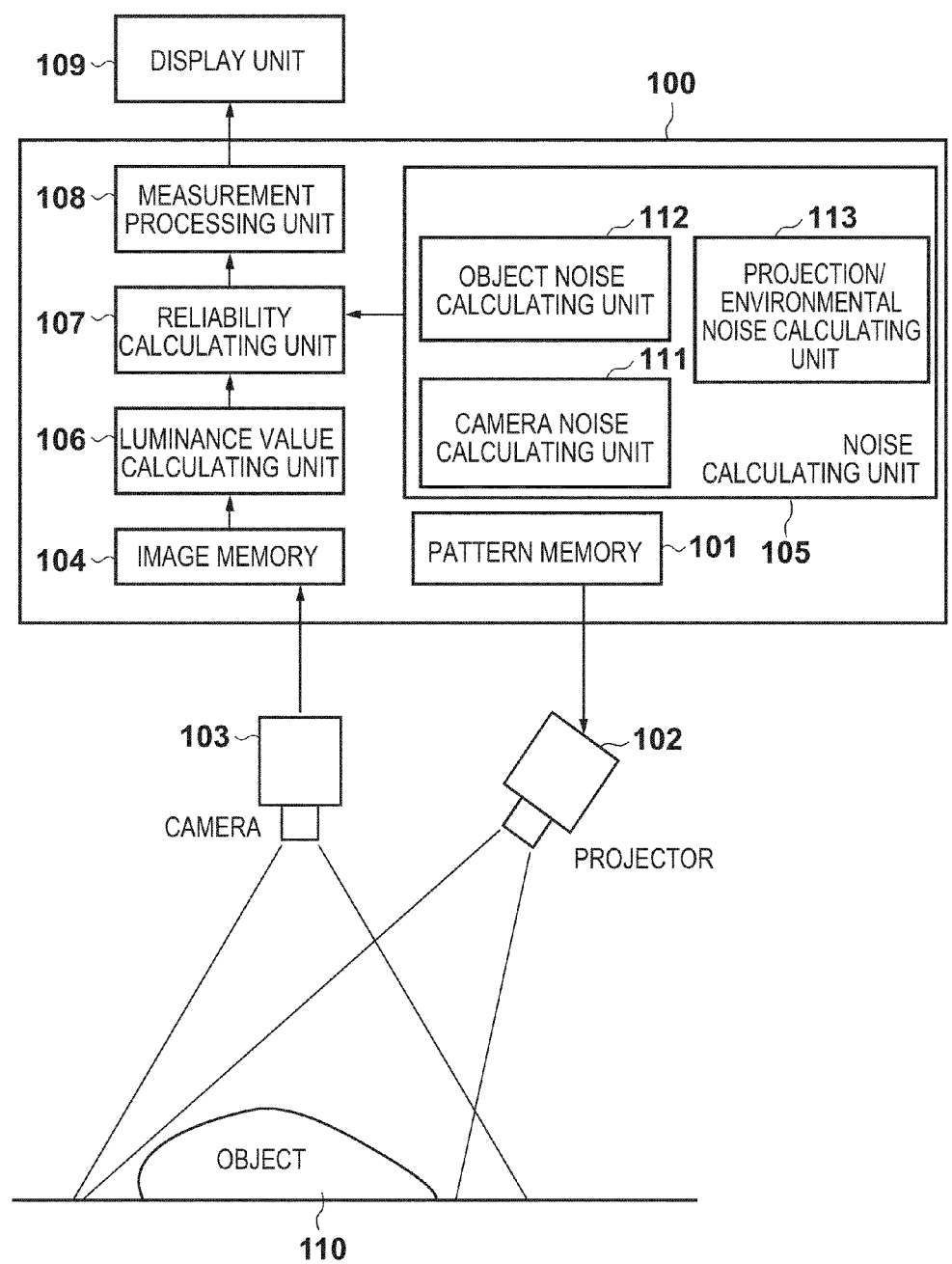
FIG. 1 is a schematic view showing the basic arrangement of a three-dimensional measuring apparatus according an embodiment.

FIG. 1 is a schematic view showing the basic arrangement of a three-dimensional measuring apparatus according to the first embodiment. The three-dimensional measuring apparatus includes a projector 102 which projects a striped light pattern onto an object to be measured (to be simply referred to as an object hereinafter) 110, a camera 103 which captures a reflected light pattern from the object 110 onto which the striped light pattern is projected, and a calculation processing unit 100 which executes various arithmetic operations. The calculation processing unit 100 instructs to project and capture the striped light pattern, and executes calculation processing for captured image data, thereby outputting three-dimensional measurement information.

The calculation processing unit 100 includes a pattern memory 101, an image memory 104, a noise calculating unit 105, a luminance value calculating unit 106, a reliability calculating unit 107, and a measurement processing unit 108. The pattern memory 101 includes, for example, a ROM, and stores, for example, a pattern shape program for generating pattern data on which a striped light pattern is based, and a time account program for setting a projection time. The pattern memory 101 transmits a generated striped light pattern shape signal to the projector 102. Also, a time account signal is transmitted to the projector 102 and the camera 103, thereby managing the projection and capturing timings of a striped light pattern.

Images captured by the camera 103 are temporarily stored in the image memory 104, and are sequentially transmitted to the luminance value calculating unit 106. The images transmitted to the luminance value calculating unit 106 are converted into data based on their pieces of pixel luminance information (luminance values). The image data represented by luminance values are transmitted to the reliability calculating unit 107.

The noise calculating unit 105 functions as a deriving unit which derives noise information in three-dimensional measurement. More specifically, the noise calculating unit 105 holds or calculates noise information. The noise information in three-dimensional measurement indicates uncertain noise due to the camera, object, projector, ambient light, and the like. The noise calculating unit 105 includes a camera noise calculating unit 111 which calculates noise information of the camera 103. The noise calculating unit 105 also includes an object noise calculating unit 112 which calculates noise due to the object, and a projection/environmental noise calculating unit 113 which calculates other noise due to the projector 102 and ambient light. Each noise calculating unit includes a method of acquiring noise information and various processing methods associated with the noise. The respective noise calculating units within the noise calculating unit 105 may exchange information with each other, as needed, and calculate noise. For example, the object noise calculating unit 112 acquires camera noise from the camera noise calculating unit 111 to obtain object noise. A noise calculating method used by each noise calculating unit will be described later. The noise information is transmitted to the reliability calculating unit 107 to calculate reliability.

The reliability calculating unit 107 performs processing of calculating the reliability of a measuring point based on the transmitted image data and noise information. A reliability calculating method will be described later. The image data and the reliability of the measuring point are transmitted to the measurement processing unit 108.

The measurement processing unit 108 calculates three-dimensional position information based on the image data.

The measurement processing unit 108 stores, for example, device-dependent parameters such as the base line lengths, focal lengths, and pixel counts of the projector 102 and camera 103, and external parameters such as the luminance of ambient light and distortion due to preceding calibration. The measurement processing unit 108 also stores a three-dimensional measurement processing program using triangulation. The measurement processing unit 108 associates the pixel of the projector 102 with that of the camera 103 for the measuring point in the image data, and performs three-dimensional measuring processing according to the principle of triangulation. A measurement result is generated as distance image data (an image including distance information for each pixel). Reliability can be assigned to each piece of distance information. It is possible to observe the distance image data as a distance image on a display unit 109.

A problem caused by camera noise and the noise calculating method used by the camera noise calculating unit 111 will be explained with reference to FIGS. 2A to 2E.

A problem caused by camera noise will be described first with reference to FIGS. 2A to 2D.

Figure 2A:
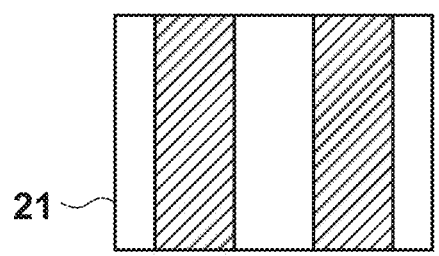
FIGS. 2A to 2E are views showing a noise calculating method used by a camera noise calculating unit.
Figure 2B:
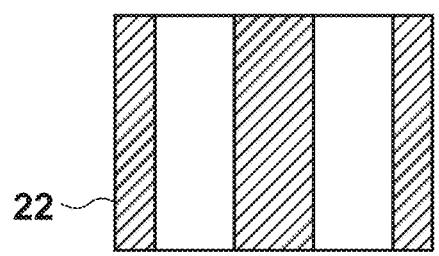

FIG. 2A shows a striped light pattern 21 to be projected. The striped light pattern 21 is a striped light pattern for Space Coding using a 3-bit gray code, and will be referred to as a positive pattern hereinafter. FIG. 2B shows a striped light pattern 22. The striped light pattern 22 is a reversed striped light pattern obtained by reversing the bright and dark sections of the striped light pattern 21, and will be referred to as a negative pattern hereinafter. FIGS. 2A and 2B exemplify the positive and negative patterns of the 3-bit striped light pattern, respectively. In actual measurement by the Space Coding method, the positive and negative patterns of one of 1-bit to 10-bit striped light patterns may be projected and captured according to the resolution of the projector. That is, it is necessary to capture 20 images for, for example, 10-bit measurement.

Figure 2C:
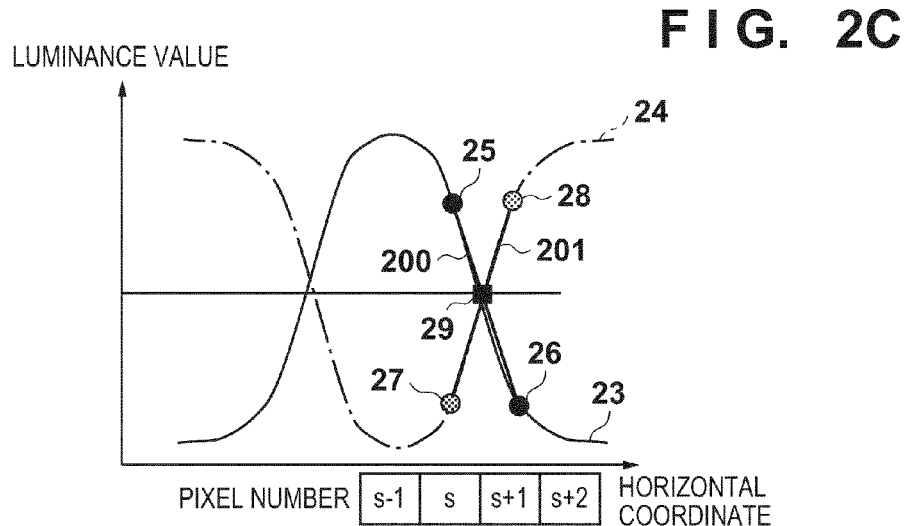

A method of deciding a boundary position will be described with reference to FIG. 2C. FIG. 2C is a graph when the ordinate plots the luminances of captured image data and the abscissa plots the horizontal pixel coordinates. A luminance curve 23 indicates the luminance of image data obtained by capturing the reflected light pattern of the striped light pattern 21, and a luminance curve 24 indicates the luminance of image data obtained by capturing the reflected light pattern of the striped light pattern 22. The relative position of a horizontal pixel coordinate of the luminance curve 23 coincides with that of a corresponding horizontal pixel coordinate of the luminance curve 24. The horizontal pixel coordinate has a spread of a pixel width. FIG. 2C shows the (s−1)th, sth, (s+1)th, and (s+2)th pixels. Points 25 and 26 on the luminance curve 23 indicate the luminance values of the sth and (s+1)th pixels, respectively. Points 27 and 28 on the luminance curve 24 also indicate the luminance values of the sth and (s+1)th pixels, respectively. A straight line connects the points 25 and 26 and a straight line connects the points 27 and 28. An intersection point 29 of line segments 200 and 201 indicates a boundary position. As described above, the horizontal pixel coordinate has a spread of the pixel width, and therefore, the position of the intersection point 29 has a sub-pixel value between the sth and (s+1)th pixels.

Figure 2D:
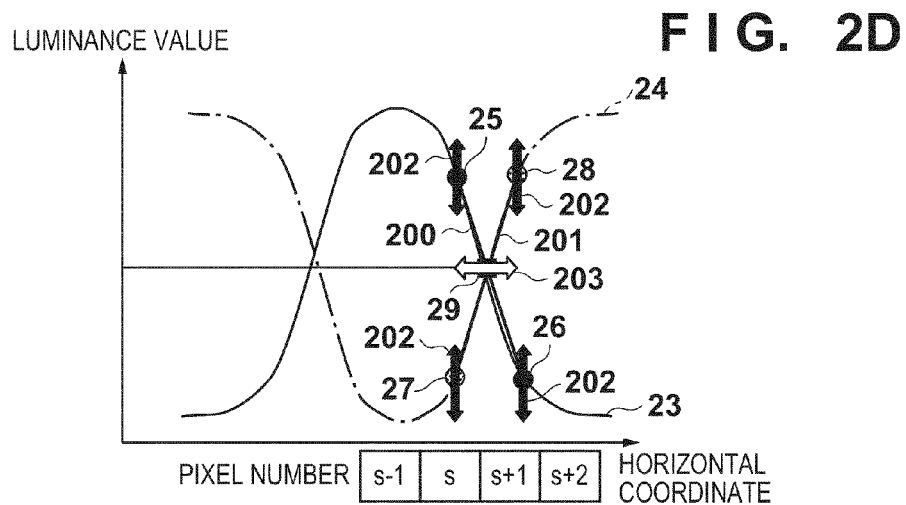

FIG. 2D schematically shows errors caused by generation of noise. Luminance errors 202 of a magnitude indicated by an arrow occur due to camera noise for the points 25 and 26 on the luminance curve 23 and the points 27 and 28 on the luminance curve 24. The luminance errors 202 cause a position error 203 for the boundary position of the intersection point 29 obtained by connecting the points 25 and 26 and connecting the points 27 and 28. That is, the distance precision is associated with camera noise, and it is therefore impossible to obtain a correct value unless reliability is calculated in consideration of camera noise.

According to the present invention, camera noise indicates noise in output data. There are mainly four types of noise including shot noise, dark current noise, readout noise, and fixed pattern noise. The dark current noise and readout noise are constant irrespective of incident light on the camera but the shot noise and fixed pattern noise change depending on the amount of incident light. The present invention is applicable to these four types of noise. A mechanism for error generation due to camera noise has been explained above.

Figure 2E:
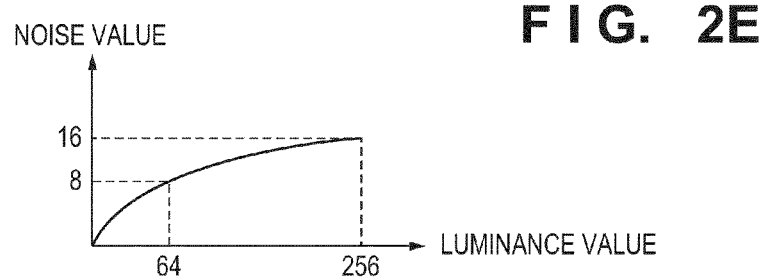

Calculation of camera noise as a function of the camera noise calculating unit 111 will be described with reference to FIG. 2E. The camera noise calculating unit 111 holds, in advance, the relationship between noise and the output data of the camera as a noise model. In a graph shown in FIG. 2E, shot noise $\sigma sn$ is 16 with a luminance value of 256 and is 8 with a luminance value of 64, thereby obtaining the relationship "$\sigma \sigma v = \sqrt{L}$ (L represents the luminance value)" between the luminance value and the shot noise $\sigma sn$. It is thus possible to obtain the shot noise $\sigma sn$ based on the luminance value of the intersection point 29.

Also for the dark current noise, readout noise, or fixed pattern noise, it is possible to obtain the noise in the same manner by acquiring, in advance, a noise model indicating the relationship between the output data and the noise.

The merits and demerits of the above method will be summarized. As the merits, since a dedicated device is used to measure noise, it is possible to acquire a noise model indicating the relationship between the noise and the output data of the camera with high precision. Furthermore, the user of the three-dimensional measuring apparatus only needs to use noise information held in advance, and thus can perform three-dimensional measurement soon. As the demerits, a dedicated device is necessary to produce three-dimensional measuring apparatuses.

In addition, in this embodiment, it is possible to acquire a noise model indicating the relationship between noise and the output data of the camera by two methods to be described below.

In one of the methods, noise information is experimentally acquired in a measuring environment, and the camera noise calculating unit 111 holds a noise model. A simple method of measuring noise which changes depending on the amount of incident light on the camera and a simple method of measuring noise which is constant irrespective of incident light on the camera will be exemplified.

Figure 3A:
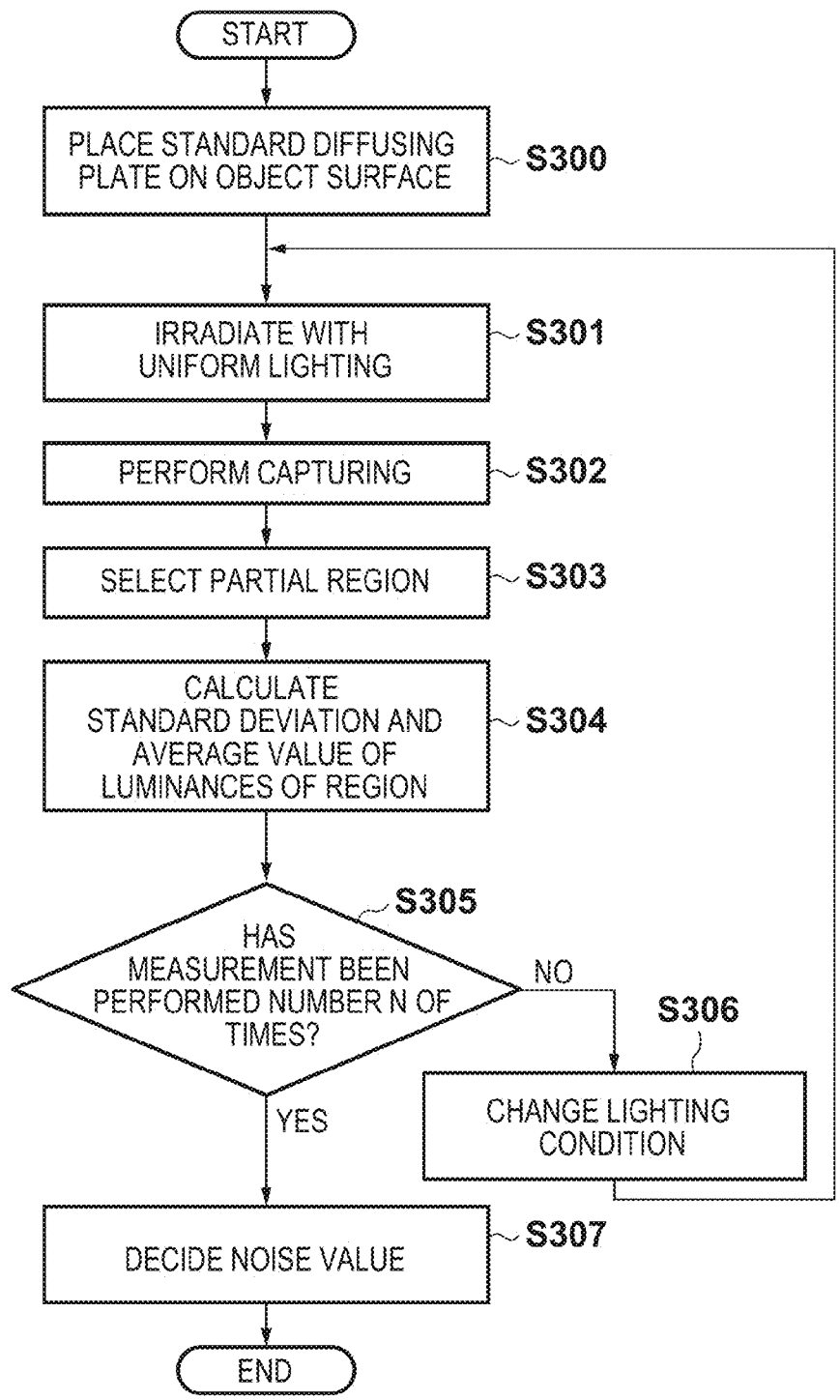
FIGS. 3A and 3B are flowcharts each illustrating noise measuring processing in the camera noise calculating unit.

FIG. 3A is a flowchart illustrating a method of measuring noise which changes depending on the amount of incident light. In step S300, the user places a standard diffusing plate within the camera capturing range of an object surface. The standard diffusing plate is used to uniformly diffuse and reflect incident light. In step S301, the object surface is irradiated with uniform lighting. For example, the entire object surface is irradiated with white light. In step S302, capturing is performed under irradiation. That is, light reflected by the standard diffusing plate is captured. In step S303, the captured data is converted into image data, thereby extracting a partial region of the standard diffusing plate. In step S304, the standard deviation and the average value of the luminances of the extracted region are calculated. The obtained standard deviation is defined as a noise value which changes depending on the amount of incident light. In step S305, it is confirmed whether the series of measuring operations up to this operation has been performed a predetermined number N of times. If the predetermined number N has not been reached, the lighting condition is changed in step S306, and the processing from capturing to calculation of noise is performed. Changing the lighting condition is to make it brighter or darker than that in the last capturing operation. After performing capturing the predetermined number of times or more, the combinations of the standard deviations and average values of the luminances, the number of which is equal to that of capturing operations, are obtained, and it is thus possible to identify the linear tendency of noise based on the values (step S307). As described above, it is possible to identify a noise value based on luminance values. The camera noise calculating unit 111 holds a noise model which changes the tendency of noise depending on the amount of incident light.

Figure 3B:
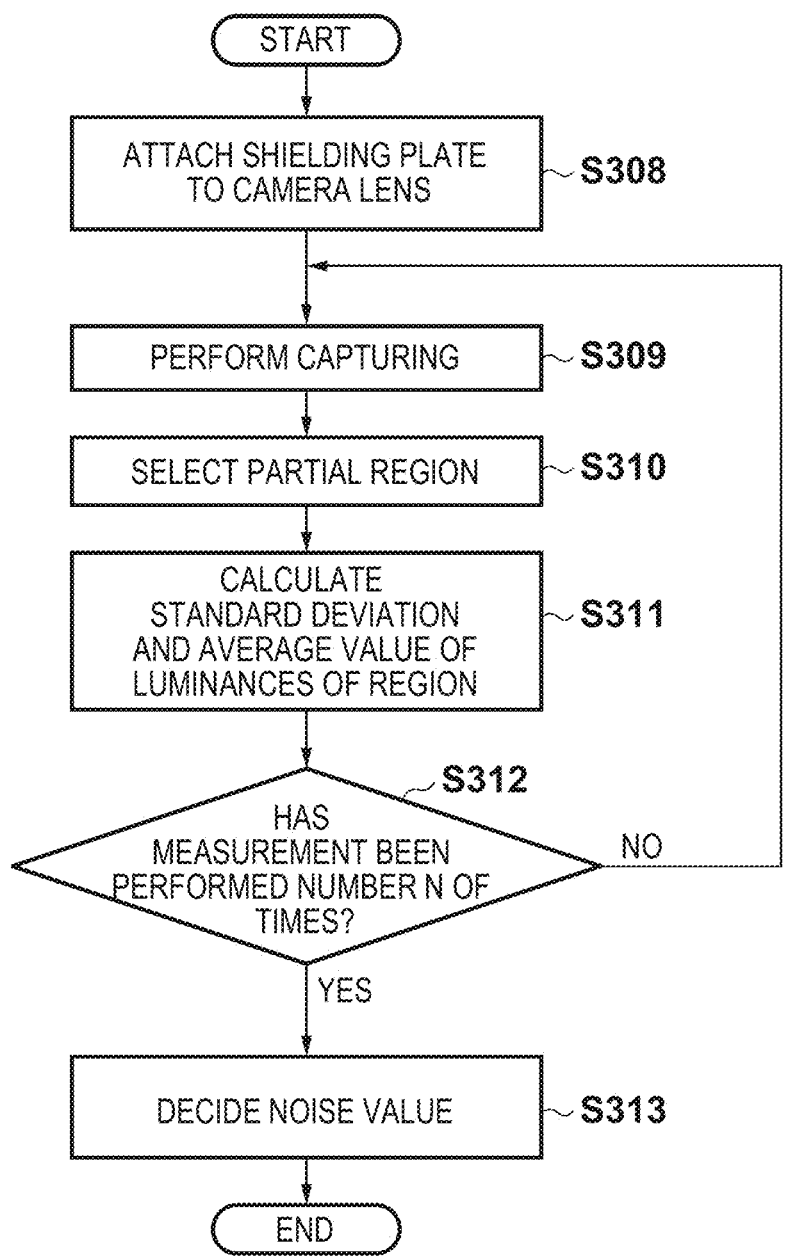

FIG. 3B is a flowchart illustrating a method of measuring noise which is constant irrespective of incident light on the camera. In step S308, the user directly attaches a shielding plate to a camera lens to eliminate the influence of ambient light. The shielding plate is desirably configured to completely prevent ambient light from entering but may be a lens cap as a simplest example. In step S309, capturing is performed. The whole captured image data has luminances close to 0. In step S310, a partial region is extracted from the image data. In step S311, the standard deviation and the average value of the luminances of the extracted region are calculated. The obtained standard deviation is defined as a noise value which is constant irrespective of incident light. In step S312, it is confirmed whether the series of measuring operations up to this operation has been performed a predetermined number N of times. If the predetermined number N has not been reached, the processing from capturing to calculation of noise is performed without changing the lighting condition. This is done to obtain a correct value as much as possible by increasing the number of samplings without deciding a noise value by only one capturing operation. After performing capturing the predetermined number of times or more, the standard deviations of the luminances, the number of which is equal to that of capturing operations, are obtained, and a noise value which is constant irrespective of incident light is decided by obtaining the average value of the standard deviations (S313). The camera noise calculating unit 111 also holds the decided noise value.

Although this method has a merit that a simple device can be used to acquire a noise model, it also has a demerit that a prior setup is complicated because the user needs to prepare to acquire a noise model as shown in FIG. 3A or 3B.

As the other method, a noise model is manually set. This method is adopted when a noise model cannot be acquired in advance and cannot be acquired in a measurement environment either. Therefore, it is highly probable that a noise model is incorrect, but it is always possible to obtain reliability by considering noise information according to the present invention.

As described above, the camera noise calculating unit 111 can acquire a noise model by the above three methods.

Figure 4A:
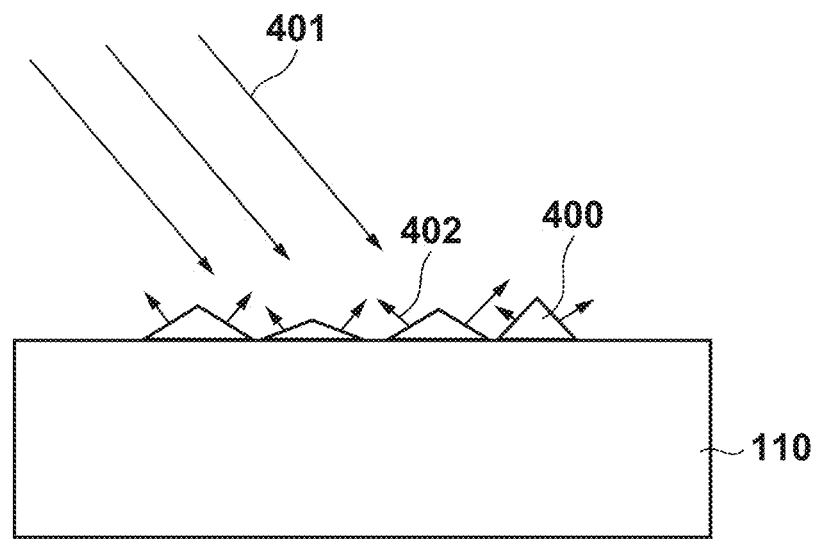
FIGS. 4A and 4B are views for explaining a noise calculating method used by an object noise calculating unit.
Figure 4B:
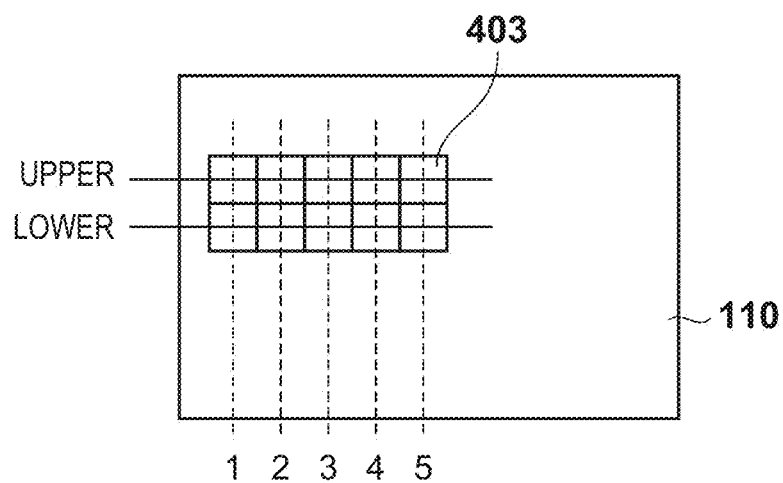

A noise calculating method used by the object noise calculating unit 112 will be described with reference to FIGS. 4A and 4B. FIG. 4A shows an object noise generation mechanism. If an unlimited number of protrusions 400 more minute than the resolution of the three-dimensional measuring apparatus exist on the object 110, projection light 401 is diffusely reflected by the object 110 and reflected light 402 scatters in various directions. If such object is observed, the surface state in which bright and dark sections are uniformly distributed is observed. Similarly to camera noise, noise caused by the object influences image luminances, thereby causing a boundary position error. The boundary position error has been explained with reference to FIGS. 2A to 2E and a description thereof will be omitted.

A method of calculating noise caused by the object will be described with reference to FIG. 4B. FIG. 4B shows an arbitrary noise acquisition region 403 on the object 110 when the camera 103 captures the object 110. The noise acquisition region 403 is a predetermined region formed by one or a plurality of pixels. In FIG. 4B, a striped pattern is projected in the horizontal direction. A description is, therefore, provided by assuming that the noise acquisition region 403 has two pixels neighboring in the vertical direction and five pixels neighboring in the horizontal direction, that is, 10 pixels. An algorithm of obtaining noise caused by the object is based on the premise that the luminance difference between neighboring regions is a combination of noise components. That is, if neighboring regions are planar, a luminance difference ideally does not occur. If a luminance difference occurs, it is considered as a combination of camera noise, noise caused by the object, and other environmental noise. Therefore, a noise value is obtained based on the luminance difference between neighboring regions.

Detailed calculation will be described. The luminances of upper regions are Pu1, Pu2, . . . from the left, and the luminances of lower regions are Pd1, Pd2, . . . from the left. The luminance differences between pixels are obtained as d1=Pu1−Pd1, d2=Pu2−Pd2, . . . A variance Vd of the obtained luminance differences is given by:

$$Vd = \sigma c^2 + \sigma r^2 + \sigma e^2 \quad (1)$$

where σc represents the camera noise value, σr represents the noise value caused by the object, and σe represents other noise such as environmental noise.

The other noise σe such as environmental noise has almost the same influence on the neighboring pixels and has only a small influence on the luminance differences. Therefore, the luminance differences mainly occur due to the camera noise σc and the object noise σr.

Consequently, if the camera noise σc is separately obtained as shown in FIG. 3A or 3B, it is possible to obtain the noise value σr caused by the object by subtracting σc² from Vd according to equation (1).

To obtain noise caused by the object by the aforementioned algorithm, three conditions are imposed to set the noise acquisition region 403. One of the conditions is that the noise acquisition region 403 is planar (condition 1). This is because if the noise acquisition region 403 is not planar and is uneven, the unevenness may generate noise in luminance. It is necessary to avoid this situation to obtain noise purely caused by the object. The remaining two conditions are that the noise acquisition region 403 is formed by neighboring pixels (condition 2) and that a region is ensured in a direction parallel to that of the striped pattern (condition 3). Conditions 2 and 3 serve as the algorithm itself.

Figure 5A:
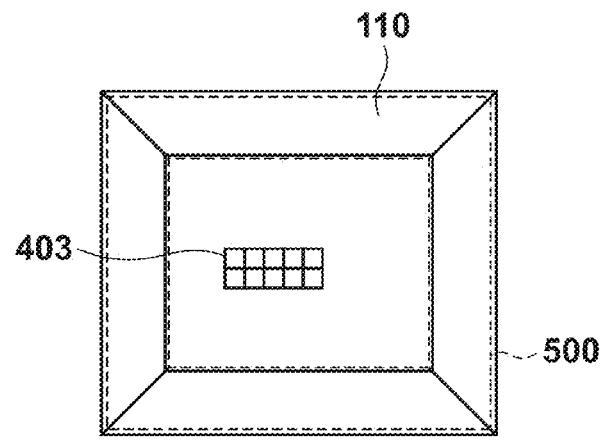
FIGS. 5A to 5C are views for explaining a calculation region acquiring method used by the object noise calculating unit.
Figure 5B:
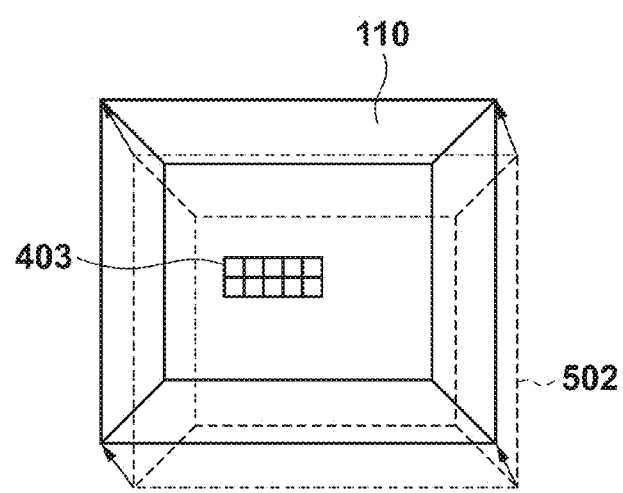
Figure 5C:
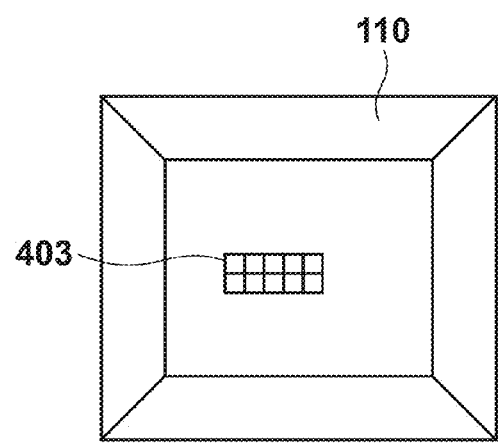

Three methods of setting the noise acquisition region 403 by searching the object for a planar shape to satisfy the condition (condition 1), described with reference to FIGS. 4A and 4B, that the noise acquisition region 403 is planar will be described with reference to FIGS. 5A to 5C. Each of FIGS. 5A to 5C is a view showing the object 110 as a quadrangular pyramid-shape rack when captured from above. FIG. 5A shows a method of setting noise acquisition region 403 by applying contour detection to a captured image. The object noise calculating unit 112 includes, as a contour extraction function, an extraction method (Sobel filter or the like) by a first derivative or an extraction method by a second derivative. Any one of the above contour extraction methods is applied to the object 110 in the obtained image, thereby performing contour extraction. Referring to FIG. 5A, dotted lines represent contour line segments 500 obtained by contour extraction. A region which does not spread over the contour line segments 500 is considered as a plane. A predetermined pixel region of the region which does not spread over the contour line segments 500 is set as the noise acquisition region 403. FIG. 5B shows a method which uses CAD data. If the shape of the object 110 is decided in advance, CAD data 502 of the object 110 is managed by the object noise calculating unit 112. By fitting the CAD data 502 to the object 110 in the obtained image, a position on the object 110 where a plane exists is determined. A predetermined pixel region within the plane determined by the fitting operation is finally set as the noise acquisition region 403. FIG. 5C shows a method of manually setting the noise acquisition region 403 in a captured image. The user manually selects a plane of the object 110 in an image onto which uniform light is projected, and sets it as the noise acquisition region 403.

As described above, the object noise calculating unit 112 can use any one of the above three methods to set the noise acquisition region 403 and calculate noise.

A method of calculating reliability in consideration of noise in three-dimensional measurement will be described with reference to FIGS. 6A and 6B.

A sub-pixel estimated error E generated when obtaining the sub-pixel value of a boundary position is set as reliability. FIG. 6A shows a method of calculating reliability in consideration of a quantizing error in luminance. The upper and lower limit luminance values are decided based on the number of bits of image data to be saved. The luminance value of 8-bit image data ranges from 1 to 256. Since, however, the luminance value is actually a more precise value, an error occurs in the luminance space defined by a luminance value of 1. This error is called a quantizing error. The sub-pixel estimated error E is a position error which is generated due to the quantizing errors in luminance values of the points 25, 26, 27, and 28 shown in FIG. 2B when deciding a position.

A method of calculating reliability in consideration of quantizing errors will be explained below. A luminance difference Id for the points 25, 26, 27, and 28 shown in FIG. 2B is determined by:

$$Id = \mathrm{abs}(L25 - L27) + \mathrm{abs}(L28 - L26) \quad (2)$$

where L25, L26, L27, and L28 represents the luminance values of the points 25, 26, 27, and 28, respectively, and abs(x−y) represents the absolute difference value between the values x and y.

Figure 6A:
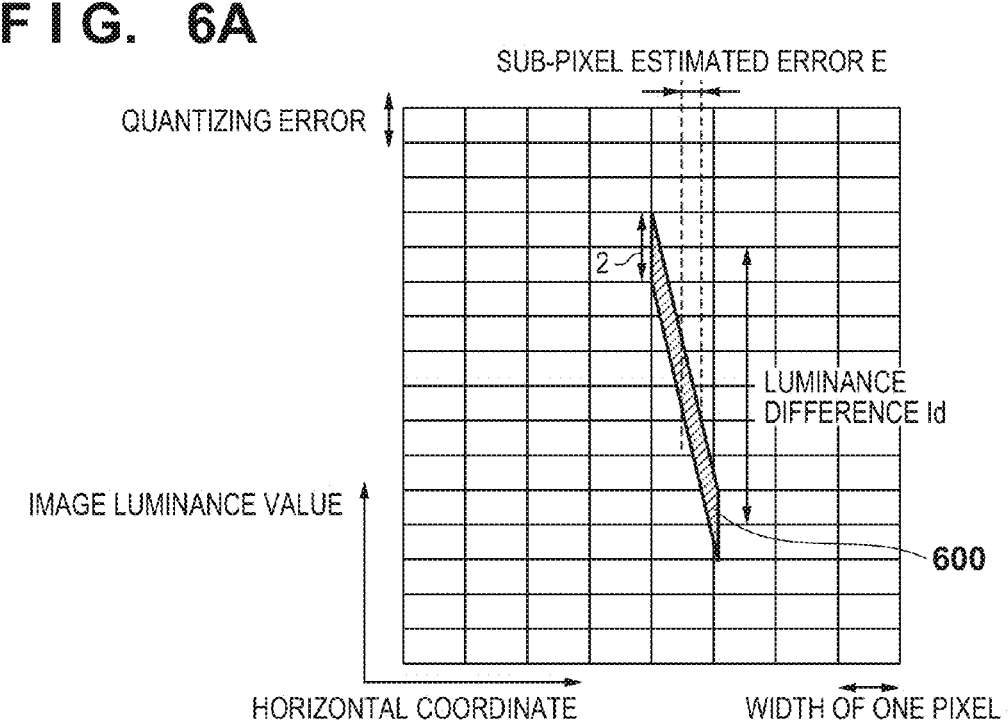
FIGS. 6A and 6B are views for explaining reliability calculation according to the first embodiment.
Figure 6B:
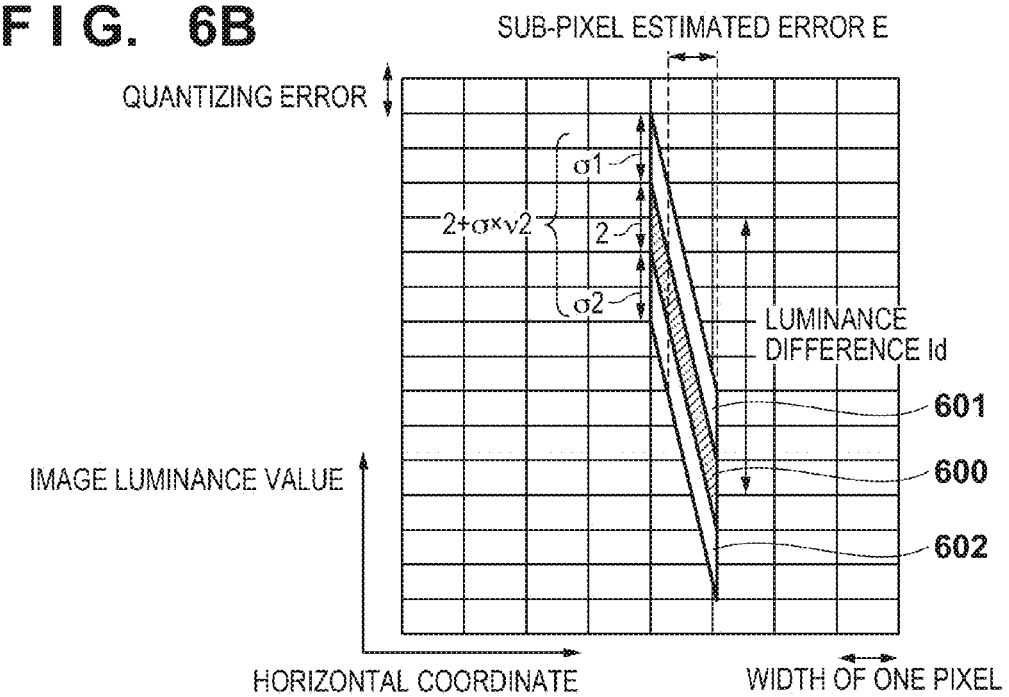

Referring to FIG. 6A, the luminance difference Id is represented by a luminance difference line segment 600. The luminance difference line segment 600 corresponds to the sum of abs(L25−L27) and abs(L28−L26), and represents a region having two errors as a quantizing error (the width of the arrow along the ordinate). Therefore, the luminance difference line segment 600 indicates a region having the luminance difference Id in the vertical direction and a value of 2 as a quantizing error. The sub-pixel estimated error E is determined based on the luminance difference Id and the value "2" as the quantizing error of the luminance difference line segment 600, as given by:

$$2 : E = Id : 1 \quad (3)$$

Equation (3) yields:

$$E = 2/Id \quad (4)$$

Equation (4) represents reliability obtained by considering the quantizing error.

A method which adds noise attributed to the camera and noise attributed to the object in the luminance values L25, L26, L27, and L28 will be described with reference to FIG. 6B. A luminance difference line segment 601 indicates noise σ1 of abs(L25−L27). Similarly, a luminance difference line segment 602 indicates noise σ2 of abs(L28−L26). In both the bright section and the dark section of the striped pattern to be projected, the luminance values remain almost the same without any large luminance difference. Therefore, assume that abs(L25−L27) abs(L28−L26) and noise σ1=σ2=σ. Since the noise is the variance of a square sum as an accidental error, a noise value obtained by combining the luminance difference line segment 601 with the luminance difference line segment 602 is σ×√2.

To obtain the sub-pixel estimated error E in consideration of the noise value in three-dimensional measurement, equation (3) is rewritten as:

$$2 + \sigma \times \sqrt{2} : E = Id : 1 \quad (5)$$

Therefore, we have:

$$E = (2 + \sigma \times \sqrt{2})/Id \quad (6)$$

where σ represents a set of σc and σr and given by:

$$\sigma = \sqrt{(\sigma_c^2 + \sigma_r^2)} \quad (7)$$

As described above, it is possible to calculate reliability in consideration of noise in three-dimensional measurement.

Noise in three-dimensional measurement mainly includes the noise σc due to the camera capturing condition and the noise σr due to the object, which have been mainly described above. It is possible to derive the other noise σe due to an environment or the like by the following method.

Calculation of the other noise σe is based on the premise that the variance Vd of the luminance differences, the noise σc due to the camera capturing condition, and the noise σr due to the object are already known.

Under the premise, the projection/environmental noise calculating unit 113 obtains the noise σe by subtracting the known noise values from equation (1). Rewriting of equation (7) in light of the calculated noise σe yields:

$$\sigma = \sqrt{(\sigma c^2 + \sigma r^2 + \sigma \epsilon^2)} \quad (8)$$

As described above, it is also possible to calculate reliability in consideration of the other noise due to an environment or the like.

According to the first embodiment, in the Space Coding method which projects the positive and negative patterns, it is possible to calculate reliability in consideration of noise in three-dimensional measurement.

The Space Coding method includes a Space Coding method which uses a positive pattern and a uniform light pattern with a uniform light amount instead of the positive and negative patterns. The reliability calculating method in that method will be described.

Figure 7A:
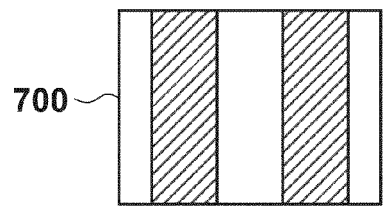
FIGS. 7A to 7D are views for explaining a principle when uniform light is used according to the first embodiment.
Figure 7B:
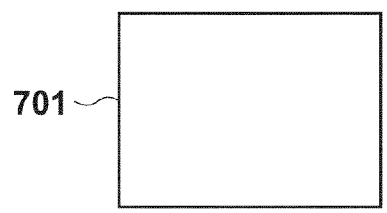
Figure 7C:
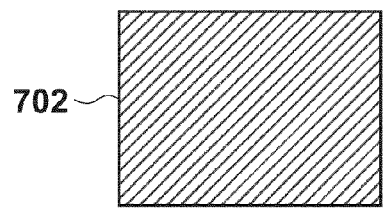

The Space Coding method which uses a positive pattern and a uniform light pattern with a uniform light amount will be described with reference to FIGS. 7A to 7D. FIG. 7A shows a striped light pattern to be projected. A striped light pattern 700 is a striped light pattern for Space Coding using a 3-bit gray code. A pattern 701 shown in FIG. 7B is a full-illumination light pattern including only a bright section. A pattern 702 shown in FIG. 7C is a full-extinction light pattern including only a dark section. 3-bit Space Coding requires 1 to 3-bit striped light patterns, the full-illumination light pattern 701 including only the bright section, and the full-extinction light pattern 702 including only the dark section.

Figure 7D:
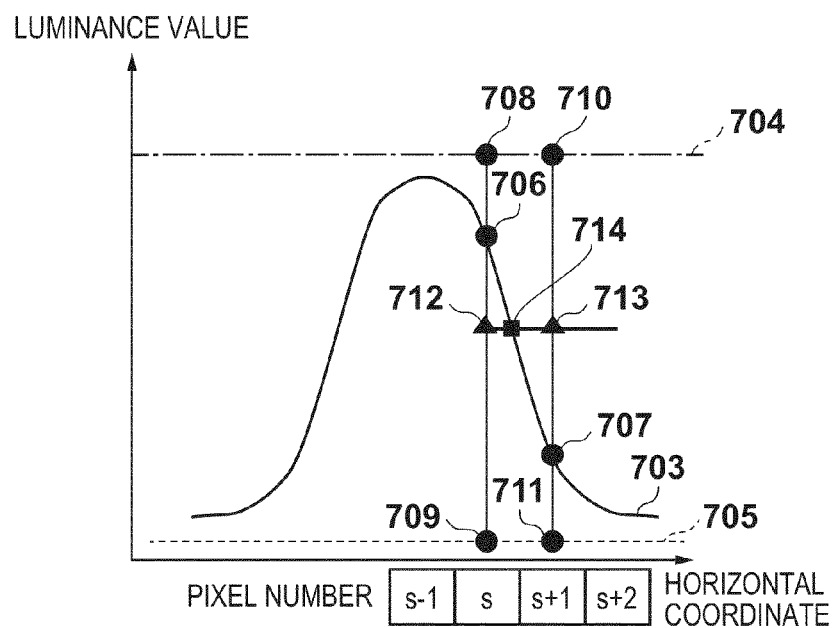

A method of deciding a boundary position will be described with reference to FIG. 7D. Pixel numbers are shown under a graph. A luminance curve 703 indicates the luminances of image data obtained by capturing the reflected light pattern of the striped light pattern 700. A luminance curve 704 indicates the luminances of image data obtained by capturing the reflected light pattern of the pattern 701 and a luminance curve 705 indicates the luminances of image data obtained by capturing the reflected light pattern of the pattern 702. Points 706 and 707 on the luminance curve 703 indicate the luminance values of the sth and (s+1)th pixels, respectively. Points 708 and 710 on the luminance curve 704 also indicate the luminance values of the sth and (s+1)th pixels, respectively. Furthermore, points 709 and 711 on the luminance curve 705 indicate the luminance values of the sth and (s+1)th pixels, respectively. If the average luminance value of pixels corresponding to the luminance curves obtained by projecting and capturing the full-illumination light pattern 701 and the full-extinction light pattern 702 is obtained, a point 712 is obtained as the average value of the points 708 and 709 of the sth pixel. A point 713 is obtained as the average value of the points 710 and 711 of the (s+1) the pixel. In this case, the horizontal coordinate of an intersection point 714 of a straight line connecting the points 706 and 707 and that connecting the points 712 and 713 is obtained. In this way, it is possible to calculate a boundary position.

As described above, the sub-pixel estimated error E generated when obtaining the sub-pixel value of the boundary position is set as reliability. Noise caused by the camera and noise caused by the object are calculated based on the luminance values of the points 706, 707, 712, and 713 used to detect the boundary position and the luminance values of the points 708, 709, 710, and 711 used to obtain the points 712 and 713. Similarly to the idea described with reference to FIGS. 6A and 6B, the noise values are added to the sub-pixel estimated error E.

As described above, it is possible to obtain reliability in the Space Coding method which uses a positive pattern and a uniform light pattern with a uniform light amount. As compared with the Space Coding method which uses the positive and negative patterns, the Space Coding method which uses a positive pattern and a uniform light pattern with a uniform light amount has low precision but needs to capture only half the number of images, which is effective for measurement requiring high speed rather than high precision. This method is adopted for many products, thereby allowing output of more correct distance information using reliability. Note that the calculation processing unit 100 according to the aforementioned embodiment may be implemented by a memory, a program stored in the memory, and a processor which controls the overall apparatus by executing the program.

Second Embodiment

In the second embodiment, a reliability calculating method in a phase shift method will be described.

Figure 8A:
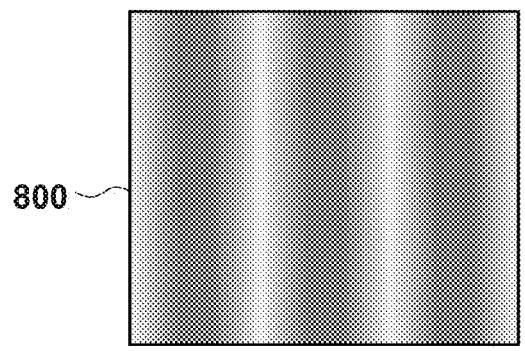
FIGS. 8A and 8B are views for explaining reliability calculation according to the second embodiment.

FIG. 8A shows a striped light pattern to be projected. A striped light pattern 800 is a striped pattern in which the brightness varies sinusoidally. In the phase shift method, a procedure of performing capturing by a camera while shifting the phase of the striped light pattern 800 by $\pi/2$ is repeated four times until the phase of the pattern is shifted by one period.

Figure 8B:
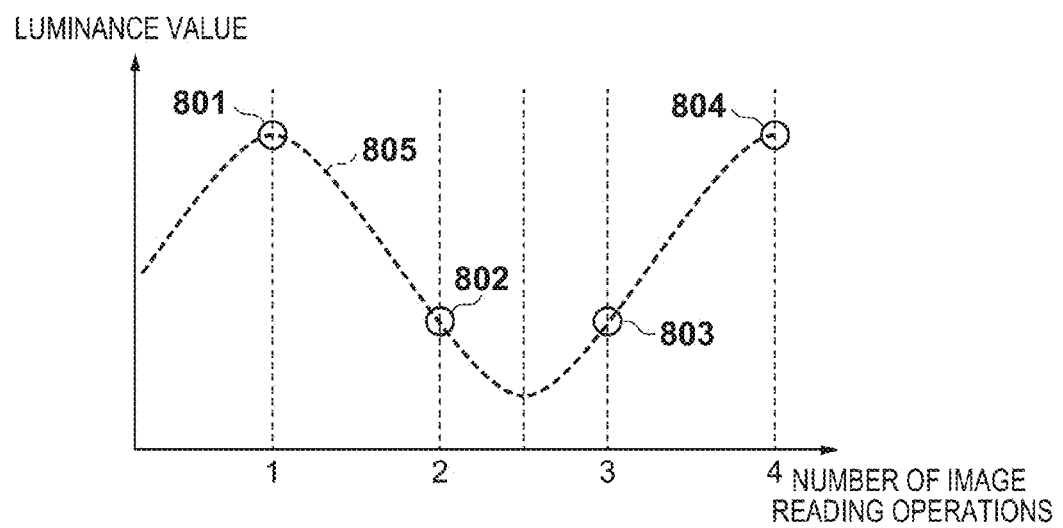

FIG. 8B is a graph when the ordinate plots the luminances of captured image data and the abscissa plots the numbers of image reading operations. Luminances 801, 802, 803, and 804 correspond to luminances at the same position (x, y) on captured images (four images in this embodiment). As shown in FIG. 8B, each of the four luminances always indicates a change by a phase difference of the striped light pattern 800. A phase $\alpha(x, y)$ of the reflected light pattern of the striped light pattern 800 at the position (x, y) is obtained as given by:

$$\alpha(x,y)=\tan^{-1}\{(L804-L802)/(L801-L803)\} \quad (13)$$

where L801, L802, L803, and L804 represent the luminance values of the luminances 801, 802, 803, and 804, respectively.

A curve 805 shown in FIG. 8B indicates a sinusoidal wave estimated by equation (13). Based on the phase, it is possible to perform three-dimensional measurement according to the principle of triangulation.

The reliability calculating method will be explained next. A variance E of the square sum of noise values of (L804−L802) and (L801−L803) of equation (13) is set as reliability. Let $\sigma 7$ be the noise value of (L804−L802) and $\sigma 8$ be the noise value of (L801−L803). Then, E is obtained by:

$$E=\sqrt{(\sigma 7^2+\sigma 8^2)} \quad (14)$$

Assume that (L804−L802≈L801−L803). In this case, the noise value is represented by $\sigma 7$, and E is obtained by:

$$E=\sigma 7\times\sqrt{2} \quad (15)$$

Similarly to the first embodiment, $\sigma 7$ includes noise $\sigma c$ due to a camera capturing condition, noise $\sigma r$ due to the object, and another noise $\sigma e$ due to an environment or the like. It is, therefore, possible to obtain reliability by calculating each noise value, as described in the first embodiment.

As described above, according to the second embodiment, it is also possible to obtain reliability in consideration of noise in three-dimensional measurement in the phase shift method. This embodiment is effective for measurement to obtain high-resolution distance information at high speed, and allows output of more correct distance information using reliability.

Third Embodiment

In the third embodiment, a reliability calculating method in a multi-slit method will be described.

Figure 9A:
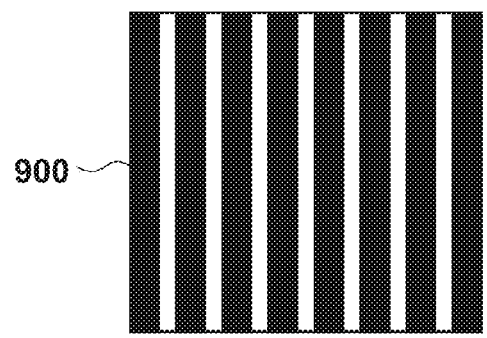
FIGS. 9A and 9B are views for explaining reliability calculation according to the third embodiment.

FIG. 9A shows a striped light pattern to be projected. A striped light pattern 900 is a striped light pattern in which bright and dark sections are regularly, repeatedly arranged. In the multi-slit method, the striped light pattern 900 is projected onto an object, and captured.

Figure 9B:
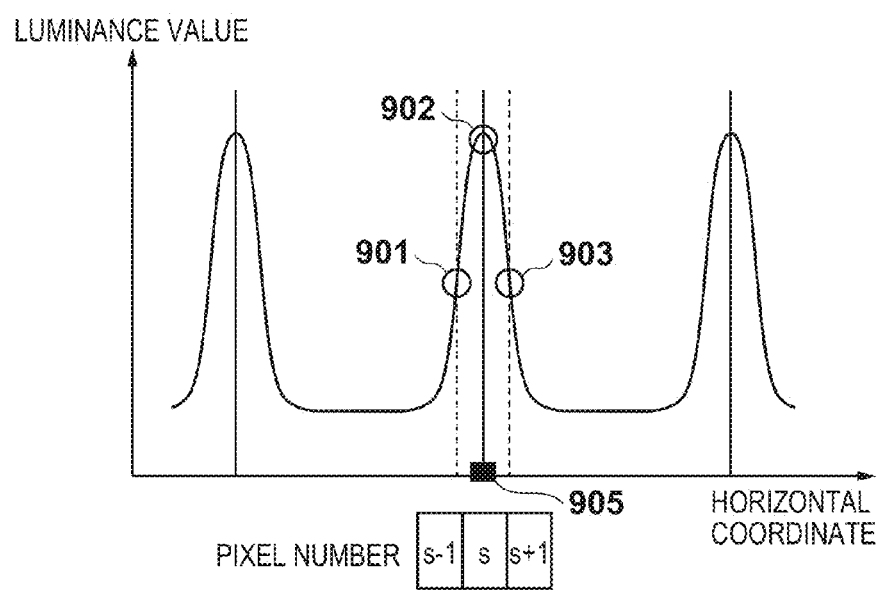

Referring to FIG. 9B which is a graph showing the relationship between a luminance value and a horizontal coordinate, captured image data is indicated by a luminance curve including a plurality of luminance peaks. Considering horizontal pixels s−1, s, and s+1, a position 905 as the barycenter position of a luminance peak is obtained using luminances 901, 902, and 903 of the pixels. A mathematical method of obtaining a barycenter position is represented by edge detection (the Sobel method or the like) by a first derivative. Three-dimensional measurement is performed based on the obtained position 905 and the positional relationship between a camera 103 and a projector 102 according to the principle of triangulation.

The reliability calculating method will be explained next. A variance E of the square sum of the noise values of the luminance values of pixels used for edge detection to obtain the position 905 is set as reliability. In the example shown in FIG. 9B, let $\sigma\rho_1$ be the noise of the luminance 901, $\sigma\rho_2$ be the noise of the luminance 902, and $\sigma\rho_3$ be the noise of the luminance 903. Then, E is given by:

$$E=\sqrt{(\Sigma\sigma\rho_n^2)} \quad (16)$$

where $\Sigma$ represents the sum of values when n=1, 2, and 3. Similarly to the first embodiment, $\sigma\rho_n$ includes noise $\sigma c$ due to a camera capturing condition, noise $\sigma r$ due to an object, another noise $\sigma e$ due to an environment or the like. As described in the first embodiment, therefore, it is possible to obtain reliability by calculating each noise value.

As described above, according to the third embodiment, it is also possible to obtain reliability in consideration of noise in three-dimensional measurement in the multi-slit method. The idea according to this embodiment can be applied to all three-dimensional measuring methods of setting the barycenter of a striped pattern as a measuring point. For example, it is also possible to calculate reliability in a method of performing measurement by one shot.

As an example of a one-shot measuring method, a grid pattern formed by vertical and horizontal lines is used as a projection pattern, and a pattern obtained by embedding a two-dimensional code pattern within the rectangle of each grid is projected onto an object. A two-dimensional position on the projected pattern is associated with that in a captured image by a code pattern. The barycenter position of the vertical and horizontal lines on the associated pattern is obtained by sub-pixel estimation, thereby performing measurement according to the principle of triangulation. According to this method, since the distance from the barycenter position of the pattern to be projected is measured similarly to the multi-slit method, the reliability calculating method in the multi-slit method can also be used in the one-shot measuring method.

The methods of calculating reliability in consideration of noise information in three-dimensional measurement in the Space Coding method, phase shift method, multi-slit method, and one-shot method have been explained above. Equations shown in the above three embodiments are merely examples, and are included in the present invention if a luminance error due to noise information in three-dimensional measurement is added.

Fourth Embodiment

In the aforementioned embodiments, in each method of obtaining reliability using luminances, the method of adding noise in three-dimensional measurement has been described. In the fourth embodiment, a reliability calculating method which raises reliability in a planar region using the shape of an object will be described.

Figure 10A:
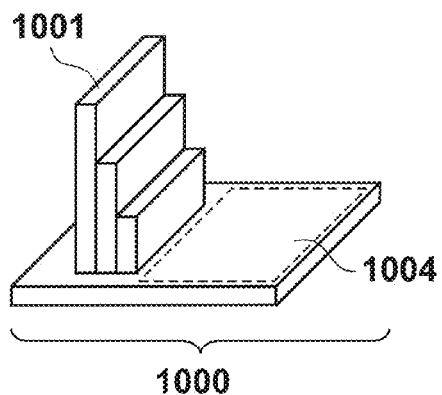
FIGS. 10A to 10C are views for explaining reliability calculation according to the fourth embodiment.

FIG. 10A is a perspective view showing an object to be measured by a three-dimensional measuring apparatus. A plurality of protrusions 1001 are placed on the base of an object 1000. In a region where the protrusions 1001 exist like the object 1000, when a striped pattern is projected, it is difficult to determine the striped pattern around the protrusions 1001 and it is thus hard to perform correct distance measurement. If the plurality of protrusions 1001 are dense, they reflect the striped light pattern, thereby causing so-called multiple reflection. This also makes it difficult to perform correct distance measurement. To the contrary, in a planar region 1004, the striped light pattern can be clearly confirmed, and multiple reflection does not occur, thereby allowing correct distance measurement.

In the fourth embodiment, the reliability around the protrusions 1001 is lowered and the reliability in the planar region is raised.

Figure 10B:
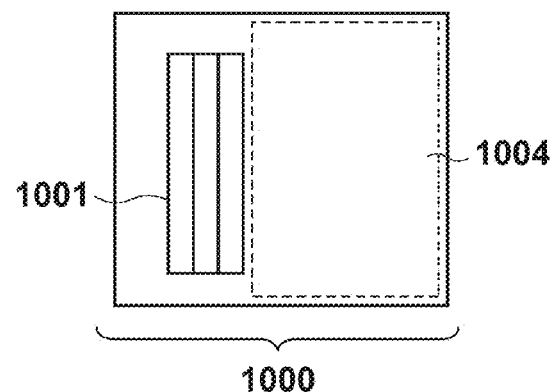

FIG. 10B is a view showing the object when observed from above. In FIG. 10B, the protrusions 1001 and the planar region 1004 are captured.

Figure 10C:
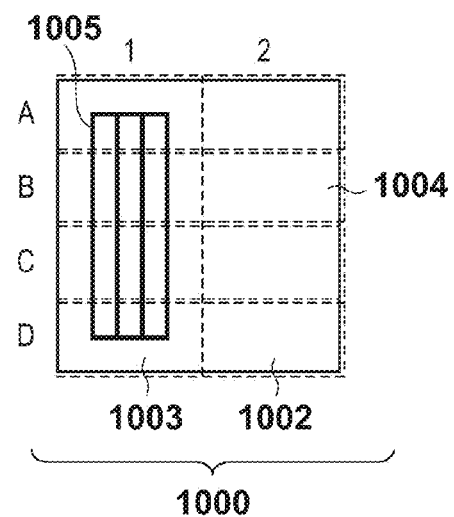
Figure 11:
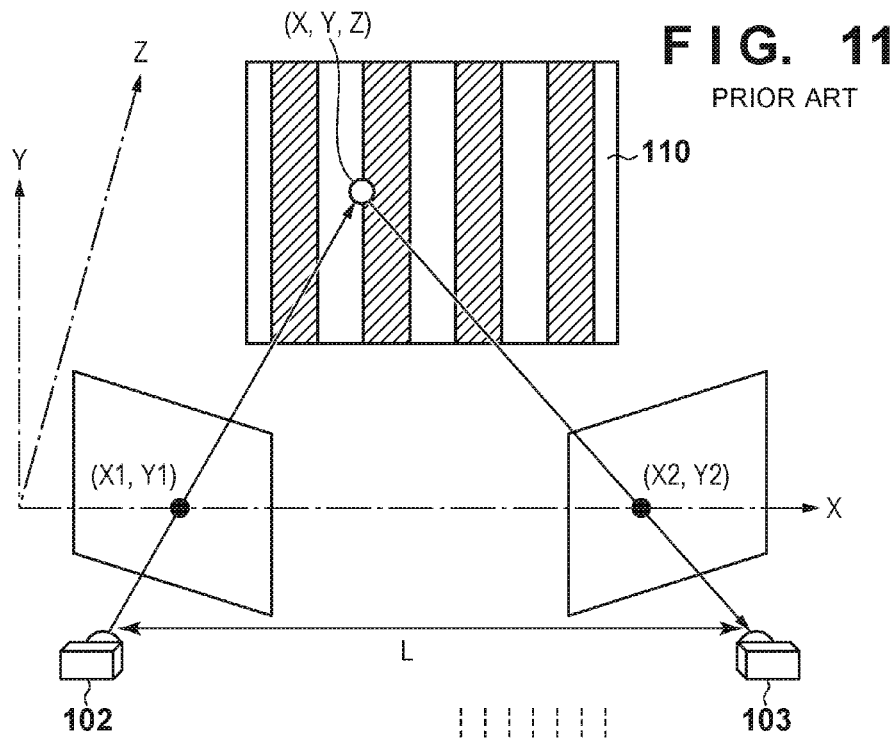
FIG. 11 is a schematic view showing the arrangement of a three-dimensional measuring apparatus and a measuring method.
Figure 12A:
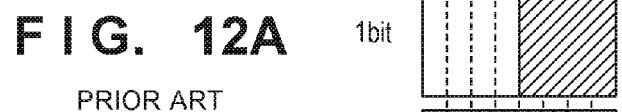
FIGS. 12A to 12C are views each showing a striped light pattern to be projected in the Space Coding method using a gray code.
Figure 12B:
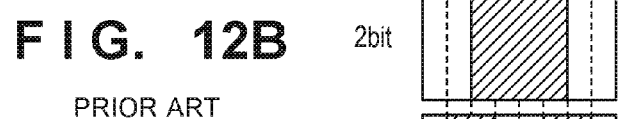
Figure 12C:
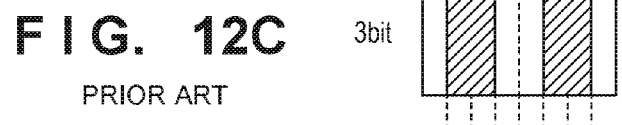
Figure 13A:
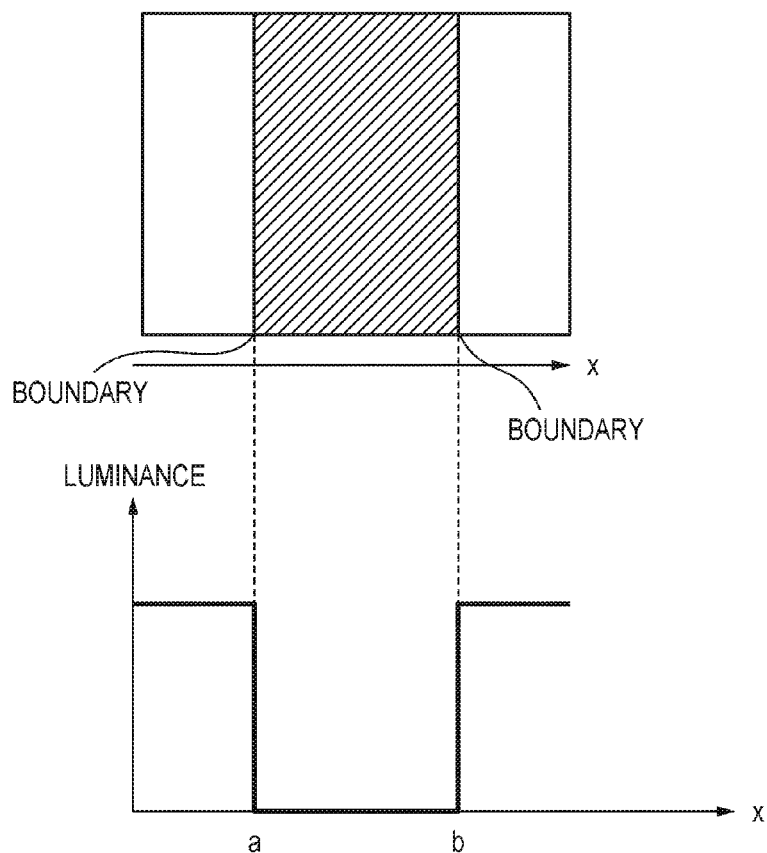
FIGS. 13A and 13B are views for explaining boundary positions.
Figure 13B:
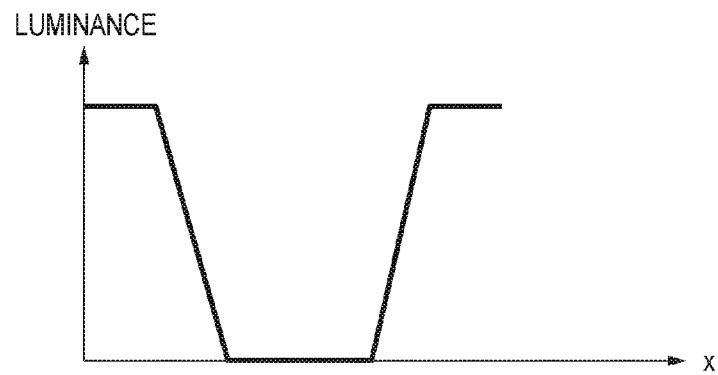

FIG. 10C is a view for explaining a reliability setting method. Contour extraction is performed for the captured object 1000 by a first derivative method or the like. Thick contours 1005 represent the result of the contour extraction. The object 1000 is divided in a mesh pattern. That is, the object image is divided into a plurality of regions. In FIG. 10C, the image is divided into four regions in the vertical direction and two regions in the horizontal direction with the size of a mesh 1002. The ratio of a region which includes contours or a plane within the mesh is calculated. The calculated ratio is set as reliability. In FIG. 10C, a region of regions A-2, B-2, C-2, and D-2 is determined to include only few contours, that is, the region is determined as a planar region 1004, thereby setting high reliability. On the other hand, a region of regions A-1, B-1, C-1, and D-1 is determined to include many contours, that is, many protrusions 1001, thereby setting low reliability.

In this embodiment, the protrusion portion of the object shape is considered as noise caused by the object shape, and reliability is set in consideration of the noise.

The reliability calculating methods have been described in the above four embodiments. An application of reliability will be explained below. As an example, it is possible to extract only distance information with high reliability using reliability when displaying a distance image on the display unit 109 of FIG. 1. Distance information with low reliability becomes noise when displaying a distance image, resulting in deterioration in recognizability. The recognizability of the user, therefore, significantly improves by displaying a distance image using only distance information with high reliability.

As another example, distance information with high precision and that with low precision can be numerically represented using reliabilities. It is possible to set a threshold for reliability, and perform measurement again for a portion including a set of pieces of distance information with reliability equal to or lower than the threshold.

It is common practice to create a three-dimensional shape model by performing measurement around an object a plurality of times using a three-dimensional measuring apparatus and combining the three-dimensional shape measurement results. At this time, it is possible to create a three-dimensional shape model with high precision by using reliability to select pieces of distance information to be combined and combining the pieces of distance information with high reliability.

As described above, there are many cases in which reliability is used. As long as it is possible to calculate correct reliability, the precision of the final result improves.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-277438, filed Dec. 19, 2012, which is hereby incorporated by reference herein in its entirety.

What is claimed is:

1. A three-dimensional measuring apparatus for measuring a three-dimensional shape of an object to be measured, comprising:
   at least one processor; and
   a memory storing a program to be executed by the at least one processor, wherein the at least one processor functions as:
      an image obtaining unit configured to obtain an image including an object to be measured onto which a pattern is projected by a projecting unit, wherein the image is captured by a capturing unit;
      a noise information obtaining unit configured to obtain noise information in measurement of the three-dimensional shape of the object to be measured, that is caused by at least one of the projecting unit, the capturing unit, and the object to be measured;
      a reliability obtaining unit configured to obtain, based on the noise information, reliability of measurement of the three-dimensional shape of the object to be measured; and
      an acquiring unit configured to acquire, based on an image captured by the capturing unit and the reliability, the three-dimensional shape of the object to be measured.

2. The apparatus according to claim 1, wherein the noise information obtaining unit derives noise information due to a capturing condition of the capturing unit.

3. The apparatus according to claim 1, wherein the noise information obtaining unit derives noise information of an image due to the object to be measured, which has been captured by the capturing unit.

4. The apparatus according to claim 2, wherein the noise information obtaining unit processes camera shot noise, dark current noise, readout noise, and fixed pattern noise as the noise information due to the capturing condition of the capturing unit.

5. The apparatus according to claim 2, wherein the at least one processor functions as:
   a second acquiring unit configured to experimentally acquire a noise model due to the capturing condition of the capturing unit before performing three-dimensional measurement,
   wherein the noise information obtaining unit holds the acquired noise model.

6. The apparatus according to claim 2, wherein the at least one processor functions as:
   a setting unit configured to manually set a noise model due to the capturing condition of the capturing unit,
   wherein the noise information obtaining unit holds the manually set noise model.

7. The apparatus according to claim 3, wherein the noise information obtaining unit calculates a luminance difference between neighboring pixels in a predetermined region.

8. The apparatus according to claim 7, wherein the noise information obtaining unit calculates noise information due to the object to be measured by using the luminance difference between the neighboring pixels in the predetermined region and the noise information due to the capturing condition of the capturing unit.

9. The apparatus according to claim 7, wherein the noise information obtaining unit extracts a planar region of the object to be measured by acquiring a feature of the shape of the object to be measured, and sets the planar region as the predetermined region.

10. The apparatus according to claim 7, wherein the noise information obtaining unit holds, in advance, CAD data of the object to be measured, extracts a planar region of the object to be measured by using the CAD data, and sets the planar region as the predetermined region.

11. The apparatus according to claim 7, wherein the noise information obtaining unit sets, according to a user instruction, the predetermined region for an image captured by projecting uniform light.

12. The apparatus according to claim 1, wherein the noise information obtaining unit acquires noise information due to at least one of the projecting unit and an environment based on a luminance difference between neighboring pixels, noise information due to a capturing condition of the capturing unit, and noise information due to the object to be measured.

13. The apparatus according to claim 1, wherein the pattern includes a bright section and a dark section, the noise information obtaining unit calculates the noise information based on luminance information in the vicinity region of the boundary position between the bright section and the dark section of the pattern in the image and the reliability obtaining unit calculates, as reliability, an estimated error for the boundary position based on the noise information.

14. The apparatus according to claim 2, wherein, when a predetermined function based on pieces of luminance information the number of which is equal to that of operations of projecting the pattern onto a measuring point of a predetermined region is set as the reliability in the three-dimensional measurement by using a phase shift method, the noise information obtaining unit calculates noise information based on the luminance information and the reliability obtaining unit calculates reliability using the noise information.

15. The apparatus according to claim 2, wherein, when an estimated error in barycenter position of a bright section of a pattern in a predetermined region is set as the reliability in the three-dimensional measurement by using a multi-slit method or a one-shot measuring method, the noise information obtaining unit calculates noise information based on luminance information of the barycenter position and the reliability obtaining unit calculates reliability using the noise information.

16. The apparatus according to claim 1, wherein, the noise information obtaining unit obtains, as the noise information, shot noise of the capturing unit.

17. The apparatus according to claim 1, further comprising the projecting unit.

18. The apparatus according to claim 1, further comprising the capturing unit.

19. A control method for a three-dimensional measuring apparatus for measuring a three-dimensional shape of an object to be measured, comprising:

obtaining an image including an object to be measured onto which a light pattern is projected by a projection unit, where the image is captured by a capturing unit;

obtaining noise information in measurement of the three-dimensional shape of the object to be measured, which is caused by at least one of the projecting unit, the capturing unit, and the object to be measured;

obtaining, based on the noise information, reliability of measurement of the three-dimensional shape of the object to be measured; and acquiring, based on a captured image and the reliability, the three-dimensional shape of the object to be measured.

20. A non-transitory computer-readable storage medium storing a program for, when loaded to a computer and executed by the computer, causing the computer to function as:

obtaining an image including an object to be measured onto which a pattern is projected by a projection unit, where the image is captured by a capturing unit;

obtaining noise information in measurement of the three-dimensional shape of the object to be measured, which is caused by at least one of the projecting unit, the capturing unit, and the object to be measured;

obtaining, based on the noise information, reliability of measurement of the three-dimensional shape of the object to be measured; and acquiring, based on a captured image and the reliability, the three-dimensional shape of the object to be measured.

21. A three-dimensional measuring apparatus for measuring a three-dimensional shape of an object to be measured, comprising:

at least one processor; and a memory storing program to be executed by the at least one processor, wherein the at least one processor function as:

an obtaining unit configured to obtain an image including an object to be measured onto which a pattern is projected by a projection unit, wherein the image is captured by a capturing unit;

a noise information obtaining unit configured to obtain noise information in measurement of the three-dimensional shape of the object to be measured, that is caused by said capturing unit;

a reliability obtaining unit configured to obtain, based on the noise information, reliability of measurement of the three-dimensional shape of the object to be measured; and an acquiring unit configured to acquire, based on an image captured by said capturing unit and the reliability, the three-dimensional shape of the object to be measured.

22. The apparatus according to claim 21, wherein, the noise information obtaining unit obtains, as the noise information, shot noise of the capturing unit.

23. A control method for a three-dimensional measuring apparatus for measuring a three-dimensional shape of an object to be measured, comprising;

obtaining an image including an object to be measured onto which a pattern is projected by a projection unit, wherein the image is captured by a capturing unit;

obtaining noise information in measurement of the three-dimensional shape of the object to be measured, that is caused by the capturing unit;

obtaining, based on the noise information, reliability of measurement of the three-dimensional shape of the object to be measured; and acquiring, based on an image captured by the capturing unit and the reliability, the three-dimensional shape of the object to be measured.

24. A non-transitory computer-readable storage medium storing a program for, when loaded to a computer and executed by the computer, causing the computer to function as:

obtaining an image including an object to be measured onto which a pattern is projected by a projection unit, wherein the image is captured by a capturing unit;

obtaining noise information in measurement of the three-dimensional shape of the object to be measured, that is caused by the capturing unit;

obtaining, based on the noise information, reliability of measurement of the three-dimensional shape of the object to be measured; and acquiring, based on an image captured by the capturing unit and the reliability, the three-dimensional shape of the object to be measured.

* * * * *